(12) United States Patent
Young

(10) Patent No.: US 6,824,584 B2
(45) Date of Patent: Nov. 30, 2004

(54) AMMONIUM PHOSPHATE/PHOSPHITE FERTILIZER COMPOUND

(76) Inventor: Donald C. Young, 245 Altura Dr., Fullerton, CA (US) 92835

( * ) Notice: Subject to any disclaimer, the term of this patent is extended or adjusted under 35 U.S.C. 154(b) by 189 days.

(21) Appl. No.: 09/898,424

(22) Filed: Jul. 3, 2001

(65) Prior Publication Data

US 2003/0061850 A1 Apr. 3, 2003

(51) Int. Cl.$^7$ ................................... C05B 9/00
(52) U.S. Cl. ................ 71/32; 71/33; 71/34; 71/64.1
(58) Field of Search ................ 71/32, 33, 34, 71/64.1

(56) References Cited

U.S. PATENT DOCUMENTS

| | | |
|---|---|---|
| 4,491,464 A | 1/1985 | Ashmead et al. |
| 4,588,431 A | 5/1986 | Nakamura et al. |
| 4,710,219 A | 12/1987 | Wahlberg et al. |
| 4,804,401 A | 2/1989 | Wahlberg et al. |
| 5,514,200 A | 5/1996 | Lovatt |
| 5,549,729 A | 8/1996 | Yamashita |
| 5,707,418 A | 1/1998 | Hsu |
| 5,797,976 A | 8/1998 | Yamashita |
| 5,800,837 A | 9/1998 | Taylor |
| 5,830,255 A | 11/1998 | Lovatt |
| 5,865,870 A | 2/1999 | Hsu |
| 6,113,665 A | 9/2000 | Lovatt |
| 2002/0129632 A1 * | 9/2002 | Sheppardson et al. ......... 71/27 |

FOREIGN PATENT DOCUMENTS

| | | | |
|---|---|---|---|
| RU | 2121990 | * | 11/1998 |
| WO | WO 9838863 A | | 11/1998 |

OTHER PUBLICATIONS

A.W. Frazier, K.R. Waerstad, *Fertilizer Research*, vol. 32, No. 2, pp. 161–168, Aug. 1992.

* cited by examiner

*Primary Examiner*—C. Sayala
(74) *Attorney, Agent, or Firm*—Banner & Witcoff, Ltd.

(57) ABSTRACT

A high concentration, stable, neutral liquid fertilizer solution containing ammonium phosphite with a preferred composition of 9.8-34-0 for use as a fertilizer and a method for production and use of such a compound is disclosed.

29 Claims, 1 Drawing Sheet

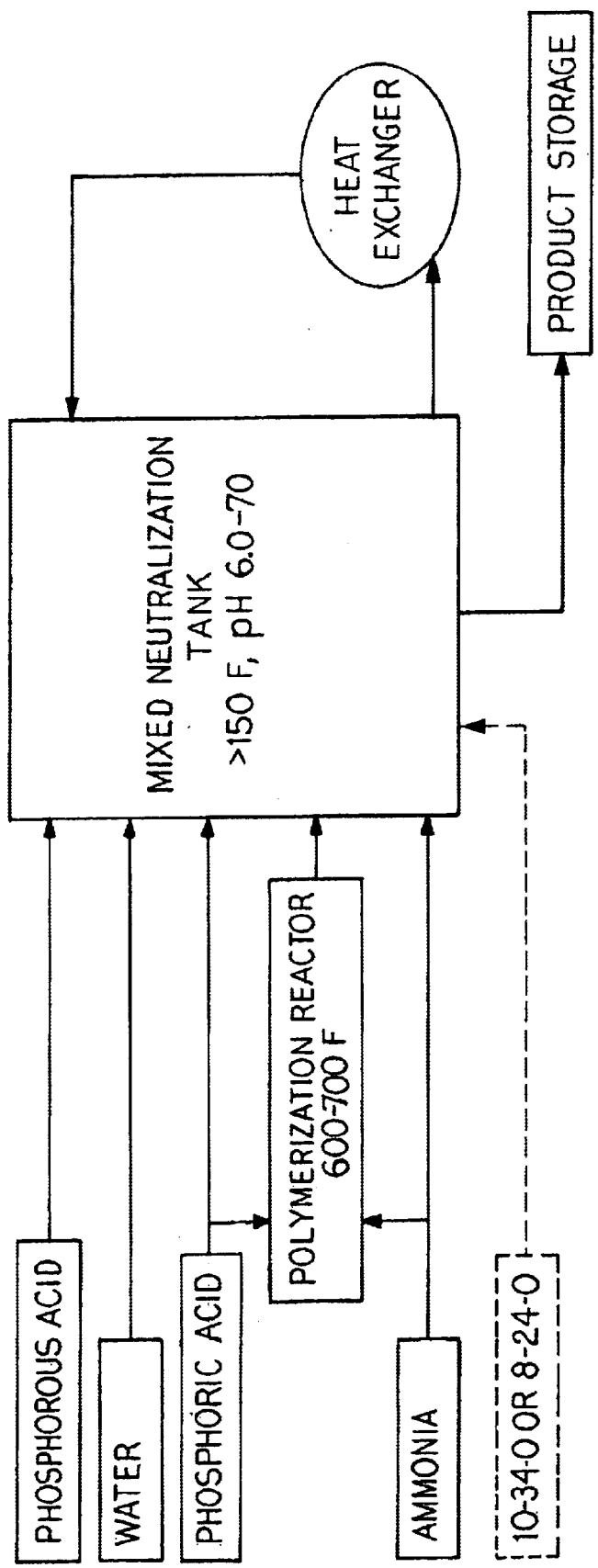

AMMONIUM PHOSPHATE/PHOSPHITE FERTILIZER COMPOUND

BACKGROUND OF THE INVENTION

In a principal aspect the present invention comprises a generally neutral, liquid phosphorus containing fertilizer having a significant phosphite ion concentration. Phosphorus acid, ammonia and water properly mixed pursuant to controlled temperature and pH conditions produce a stable phosphite ion containing solution which may be mixed with other fertilizer materials including ammonium phosphates. The invention further relates to methods for preparing such fertilizers and the use of such fertilizers on plants.

Nitrogen, phosphorus and potassium are principal elements found in fertilizer compositions applied as solutions or in granular form to enhance plant growth. A great deal of research and development has focused upon maximizing the efficacious delivery of these elements to plant life. Various compositions incorporating these elements have been patented. For example, Hsu in U.S. Pat. No. 5,707,418 discloses an inorganic phosphorus containing fertilizer comprised of various phosphorus compounds in the form of acids or salts in combination with an inorganic complexing agent. The purpose of the Hsu invention is to provide a highly stable, concentrated phosphorus containing fertilizer, which can be stored for long periods of time yet easily absorbed through the foliage system or the root system of a plant and a process for manufacturing the material. Hsu in U.S. Pat. No. 5,865,870 discloses a phosphorus containing fertilizer, which is a combination of polyphosphoric acid and salts and phosphorous acid, with the goal of obtaining increased phosphorus uptake by plants exposed to this fertilizer. Lovatt, in a series of patents including U.S. Pat. Nos. 5,514,200 and 6,113,665 discloses concentrated phosphorus containing fertilizers that employ buffered compositions or defined mixtures of phosphorus compounds in order to supply phosphorus to plants thereby enhancing phosphorus uptake.

Other patents and publications which relate to such compositions, their manufacture and use, include the following: U.S. Pat. Nos. 5,800,837; 5,830,255; 5,864,418; and *Fertilizer Research* 32, 161–168 (1992).

Reported research indicates that delivery of the phosphorus element to plant life may be effected by exposure to either a phosphate ion (e.g. $H_2PO_4^{-1}$) or a phosphite ion (e.g. $H_2PO_3^{-1}$). Phosphite ion exposure appears to have an advantage when applied in a solution form to the foliation of a plant because it is more readily assimilated than a phosphate ion. Additionally, combinations of phosphite and phosphate ions are believed to be more effective than either alone in plant assimilation and in providing an effective means for controlling plant fungus diseases.

Providing phosphite ion containing fertilizers constitutes a significant challenge. Formulations of phosphite ion containing materials that have been previously suggested as fertilizers are phosphorous acid ($H_3PO_3$), and potassium phosphite, ($K_2HPO_3$). However, phosphorous acid is a stronger acid than phosphoric acid and is highly corrosive thus diminishing its desirability as a phosphite ion source. Potassium phosphite is an expensive compound typically made by neutralizing phosphorous acid with potassium hydroxide. The reaction is highly exothermic. The heat evolved is a challenging problem since phosphorous acid is very unstable. That is, as phosphorous acid is heated above 180° centigrade, then phosphine, $PH_3$, is produced. Phosphine is a highly toxic gas that is spontaneously flammable in air.

As a consequence there is a need for a low cost, safe, efficacious source of phosphorous in the form of a phosphite ion ($HPO_3^{-2}$, $H_2PO_3^{-1}$) that is stable, having neutral or nearly neutral pH and preferably in combination with a nitrogen source. Further, it is desirable to have such a material which can be manufactured utilizing present day, available fertilizer production facilities.

SUMMARY OF THE INVENTION

Briefly, the present invention comprises a phosphorus containing fertilizer composition which includes a significant phosphite ion concentration, and in a preferred embodiment, nitrogen and phosphate ions in the form of ammonium phosphates and polyphosphates. The fertilizer is in the form of a concentrated liquid solution which may be diluted, mixed with other plant growth constituents such as urea, etc., and has a pH when in water solution in the range of about 5 to 8, preferably in the range of about 5.5 to 6.5 or about 6.2. In the preferred embodiment, the composition has a nitrogen concentration in weight percent of about 6 to 10 and a phosphorus concentration in weight percent in the form of $P_2O_5$ of about 22 to 36. A preferred process for manufacture of the composition utilizes slightly modified ammonium phosphate fertilizer manufacturing facilities to combine phosphorous acid, ammonia and water under controlled conditions of maintaining the temperature below 150° F. and the pH generally neutral during batch or continuous process mixing. Mixtures of manufactured ammonium phosphites and species of ammonium phosphates are considered most desirable, particularly when the weight percent of phosphorus ($P_2O_5$) from the phosphite and phosphate compounds are about equal. A most preferred composition comprises a 9.8-34-0 ammonium phosphite/ammonium phosphate solution. The compositions demonstrate significantly improved phosphorus uptake.

Thus it is an object of the invention to provide an improved phosphorus source fertilizer composition.

Yet another object of the invention is to provide a fertilizer composition having a significant source of phosphorus in the form of a phosphite ion and further including a significant source for nitrogen.

Yet another object of the invention is to provide a fertilizer composition which may be manufactured utilizing currently available ammonium phosphate facilities wherein the composition contains highly concentrated amounts of the phosphite ion.

Another object of the invention is to provide a safe, cost effective, and easily monitored process for the manufacture of a phosphorus containing fertilizer in liquid form which has a high concentration of the phosphite ion.

Another object of the invention is to provide various methods and formulations for the manufacture of a nitrogen/phosphorus containing fertilizer composition wherein the phosphorus portion of the composition is in the form of a phosphite ion in solution and wherein the solution is neutral or nearly neutral.

These and other objects, advantages, and features of the invention will be set forth in the detailed description that follows.

BRIEF DESCRIPTION OF THE DRAWING

The single drawing comprises a schematic diagram illustrating the steps and the process of manufacture of the nitrogen/phosphorus fertilizer composition of the invention.

DESCRIPTION OF THE PREFERRED EMBODIMENT

As previously noted, a basic object of the invention is to produce a high concentration, stable, neutral pH, or nearly neutral pH, liquid fertilizer solution containing ammonium phosphite as a phosphite ion source. A further object is to provide a process for producing such a product using conventional ammonium phosphate fertilizer production facilities.

As background, it is noted that phosphorous acid, $H_3PO_3$, contains the phosphorus atom in the +4 oxidation state rather than the +5 oxidation state of phosphoric acid, $H_3PO_4$. While both acids contain three hydrogen atoms, phosphorous acid contains only two ionizable hydrogen atoms. This results because one hydrogen atom in the phosphorous acid is covalently bonded to the phosphorus atom and does not react with neutralizing agents. In contrast, in phosphoric acid all three hydrogen atoms are ionizable.

On average, phosphorous acid is about five times stronger as an acid than phosphoric acid. Phosphorous acid has about the same acid strength as sulfuric acid. Therefore this increased acid strength may indicate the reason that phosphorous acid as a source of the phosphite ion is more active and better transmutable as a phosphorous source for plants. The adverse impact of being an acid, however, precludes its effective use as a fertilizer.

Investigative research by applicant has shown that a mixture of monoammonium phosphite, $NH_4H_2PO_3$, and diammonium phosphite $(NH_4)_2$ $(HPO_3)$ has greater water solubility than either of the salts alone. Thus mixing the two compounds provides a synergistic solubility. Further research by applicant has indicated that maximum water solubility results when there is a measured stoichiometry of $(NH_4)$ 1.4 H 1.6 $PO_3$. At this maximum water solubility the solution pH is 6.2 which is very tolerable in an agrarian environment. From this research it was determined that an ammonium phosphite solution containing 9.6% nitrogen (N) and 34 percent phosphite ($P_2O_5$) could be prepared by mixing ammonia, water and 0-60-0 phosphorous acid under reasonable controlled conditions of temperature and pH. Utilizing these starting materials simplifies production enabling use of slightly modified ammonium phosphate fertilizer production facilities. Through this method of preparation, creation of a useful ammonium phosphite solution as a source of nitrogen and phosphorous in the form of phosphite ions for agricultural uses is possible.

An alternative product composition containing $P_2O_5$ (as a combination of phosphite and phosphate ions) comprises a mixture of 50 percent of 10-34-0 ammonium polyphosphate solution and 50 percent 9.6-34-0 ammonium phosphite solution made in accord with the process of the invention. The resulting mixture is a 9.8-34-0 compound and solution having 17 percent of the phosphorus ($P_2O_5$) derived from phosphate and 17 percent of the phosphorous ($P_2O_5$) derived from phosphite. The nitrogen is, of course, derived from the ammonia.

The 9.8-34-0 ammonium phosphite/ammonium phosphate solutions or the 9.6-34-0 ammonium phosphite solution can be blended in all proportions with standard 10-34-0 or 8-24-0 fertilizer compounds to produce any phosphate/phosphite ratio. Additionally the created product can be mixed with urea, urea solution, potassium chloride, potassium sulfate and potassium phosphate to provide a desired, stable solution with potassium for plant application. The solutions of the invention thus can be used as substitutes for standard 10-34-0 and 8-24-0 materials commercially available.

The products have been evaluated for stability. They have been stored, exposed to air at temperatures of 95° F. for several weeks and mixed with nitrate compounds. No oxidation or other chemical or physical changes have been detected. Thus from a stability viewpoint the products are highly desirable. The following are examples of the manufacturing process as conducted in the laboratory:

EXAMPLE 1

Laboratory batches of the 9.6-34-0 product were prepared as follows. The quantity of 270 g of water was added to a stirred batch reactor. Then 454 g of 0-60-0 phosphorous acid (Chemgrow Co., Solana Beach, Calif.) and 76.8 g of anhydrous ammonia were added simultaneously to the reactor over a period of about 20 minutes. The addition rate of the phosphorous acid and the ammonia were adjusted to maintain the pH of the reaction mixture between 5.5 and 6.5. The reaction mixture was cooled with an ice bath to maintain the reaction temperature <60° C. The resulting product was a clear light green solution with a pH of 6.2 and specific gravity of 1.305 2 @ 20° C. The product has a crystallization temperature of <−7° C. (20° F.).

EXAMPLE 2

Laboratory batches of the 8.8-29-0 product were prepared as follows. The quantity of 400 g of 8-24-0 ammonium orthophosphate solution and 135 g of water were added to a stirred batch reactor. Then 227 g of 0-60-0 phosphorous acid (Chemgrow Co., Solana Beach, Calif.) and 38.4 g of anhydrous ammonia were added simultaneously to the reactor over a period of about 20 minutes. The addition rate of the phosphorous acid and the ammonia were adjusted to maintain the pH of the reactor mixture between 5.5 and 6.5. The reaction mixture was cooled with an ice bath to maintain the reaction temperature <60° C. The resulting product was a clear light green solution with a pH of 6.5 and specific gravity of 1.261 @ 20° C. The product has a crystallization temperature of <−7° C. (20° F.).

EXAMPLE 3

Laboratory batches of the 9.8-34-0 product were prepared as follows. The quantity of 400 g of 10-34-0 ammonium orthophosphate/ammonium polyphosphate solution (Western Farm Service Alpaugh production) and 135 g of water were added to a stirred batch reactor. Then 227 g of 0-60-0 phosphorous acid (Chemgrow Co., Solana Beach, Calif.) and 38.4 g of anhydrous ammonia were added simultaneously to the reactor over a period of about 20 minutes. The addition rate of the phosphorous acid and the ammonia were adjusted to maintain the pH of the reaction mixture between 5.5 and 6.5. The reaction mixture was cooled with an ice bath to maintain the reaction temperature <60° C. The resulting product was a clear light green solution with a pH of 6.2 and specific gravity of 1.293 @ 20° C. The product has a crystallization temperature of <−7° C. (20° F.). The composition and physical properties of the product are listed in Table 1.

TABLE 1

| Product Name: 9.8-34-0 Ammonium phosphate/phosphite Solution | |
|---|---|
| % N: | 9.8 |
| % $P_2O_5$ from Phosphate: | 17 |
| % $P_2O_5$ from Phosphite: | 17 |
| pH: | 6.2 ± .2 |
| Specific Gravity, 68° F.: | 1.293 |
| Lb./gal: | 10.78 |

TABLE 1-continued

| Composition | Weight % |
| --- | --- |
| 10-34-0 Ammonium phosphate solution | 50.00 |
| 0-60-0 Phosphorous acid | 23.33 |
| 82-0-0 anhydrous ammonia | 5.86 |
| Water | 15.81 |

EXAMPLE 4

Laboratory batches of the 6.4-34-0 product were prepared as follows. The quantity of 370 g of water was added to a stirred batch reactor. Then 369 g of 0-74-0 polyphosphorous acid (50% $H_3PO_3$ and 50% $H_4P_2O_5$) and 62.4 g of anhydrous ammonia were added simultaneously for mixing to the reactor over a period of about 20 minutes. The addition rate of the polyphosphorous acid and the ammonia were adjusted to maintain the pH of the reaction mixture between 5.5 and 6.5. The reaction mixture was cooled with an ice bath to maintain the reaction temperature <60° C. The resulting product was a clear light green solution with a pH of 6.6 and specific gravity of 1.252 @ 20° C. The product has a crystallization temperature of <−7° C. (20° F.). The product was blended with an equal weight of 10-34-0 ammonium phosphate to produce a stable solution of composition 8.2-34-0.

During the preparation of ammonium phosphite solutions it is very important to maintain the reaction mixture near neutral pH (5.0 to 7.0) or some phosphite can be oxidized to phosphate. This effect is illustrated by the following examples.

EXAMPLE 5

The 9.6-34-0 product were prepared as follows. The quantity of 270 g of water was added to a stirred batch reactor. Then 454 g of 0-60-0 phosphorous acid (Chemgrow Co., Solana Beach, Calif.) and 76.8 g of anhydrous ammonia were added simultaneously to the reactor over a period of about 20 minutes. The addition rate of the phosphorous acid and the ammonia were adjusted to maintain the pH of the reaction mixture between 5.5 and 6.5. The reaction mixture was cooled with an ice bath to maintain the reaction temperature <60° C. The resulting product was a clear light green solution with a pH of 6.2 and specific gravity of 1.305 @ 20° C. The product has a crystallization temperature of <−7° C. (20° F.). Analysis of the product by ion chromatography showed that it contained 34.5% $P_2O_5$ as $HPO_3^{2-}$.

EXAMPLE 6

The 9.6-34-0 product were prepared as follows. The quantity of 270 g of water and 454 g of 0-60-0 phosphorous acid (Chemgrow Co., Solana Beach, Calif.) were added to a stirred batch reactor. Then 76.8 g of anhydrous ammonia was added to the reactor over a period of about 20 minutes. Control of pH was not regulated. The reaction mixture was cooled with an ice bath to maintain the reaction temperature <60° C. The resulting product was a clear light green solution with a pH of 6.2 and specific gravity of 1.299 @ 20° C. Analysis of the product by ion chromatography showed that it contained 25.4% $P_2O_5$ as $HPO_3^{2-}$ and 8.5% $P_2O_5$ as $PO_4^{3-}$.

EXAMPLE 7

To demonstrate the stability of phosphite in nitrate solutions under various starting material conditions, a series of tests were conducted.

1. It is known that the phosphite ion ($HPO_3^{-2}$ is a strong reducing agent:

$$HPO_3^{-2} \rightarrow H_3PO_4 + 2H^+ + 2e^- \quad Eo=0.276v$$

2. Also the nitrate ion ($NO_3^-$) is a strong oxidizing agent:

$$\text{Nitrate ion } NO_3^- + 3H^+ + 2e^- \rightarrow HNO_2 + H_2O \quad Eo=-0.94v$$

The above oxidation-reduction potentials indicate that $HPO_3^{-2}$ will be oxidized by $NO_3^-$ to $HPO_4^{2-}$ according to the following reaction:

1. $HPO_3^{-2} + NO_3^- \rightarrow HPO_4^{2-} + NO_2^-$

However, the kinetics of the reaction is not known. A laboratory study was carried out to measure the stability of $HPO_3^{-2}/NO_3^-$ solutions of various types.

The study was conducted by preparing:
1. Solution 1—A solution of 25% ammonium nitrate, 40% 9.8-34-0 ammonium phosphite/phosphate solution and 35% water. (Initial composition is 6.8% $P_2O_5$ as phosphite and 6.8% $P_2O_5$ as phosphate.)
2. Solution 2—A solution of 25% ammonium nitrate, 11.3% 0-60-0 phosphorous acid and 63.7% water. (Initial composition is 6.8% $P_2O_5$ as phosphite.)

The solutions were each maintained at 20° C. (68° F.) and analyzed periodically using ion chromatography. Table 2 records the results:

TABLE 2

| | % $P_2O_5$ as Phosphite | | % $P_2O_5$ as Phosphate | |
| --- | --- | --- | --- | --- |
| Time | Solution 1 | Solution 2 | Solution 1 | Solution 2 |
| 0 hr | 6.8 | 6.8 | 6.8 | Nil |
| 2 hr | 6.8 | 5.9 | 6.7 | 0.8 |
| 4 hr | 6.8 | 1.2 | 6.7 | 5.7 |
| 8 hr | 6.8 | Nil | 6.7 | 6.9 |
| 1 day | 6.8 | Nil | 6.7 | 6.8 |
| 10 days | 6.8 | NA | 6.7 | NA |
| 28 days | 6.8 | NA | 6.7 | NA |

*NA: Not Analyzed

The results are surprising for Solution 1. There is no measurable change after 28 days. By contrast, Solution 2 shows the expected rapid oxidation of phosphite to phosphate. The specific composition of 9.8-34-0 significantly reduces the rate of reaction 1 (above) as demonstrated by the results for solution 1, which is, of course, an embodiment of the invention. This is a great practical advantage since fertilizers containing both phosphite and nitrate can be manufactured, distributed and applied without loss of phosphite.

Manufacturing Process

The process for the manufacture of commercial quantities of the fertilizer is schematically illustrated in the figure. The process may be operated in a batch or a continuous manner. Hourly through put is preferably about equal to the volume of the process container. Preferably the process is maintained and operated in a facility wherein cooling apparatus is provided to maintain the formulation or mixing operations at less than 150° F. Hot spots are to be avoided. Maintaining the temperature below 150° F. is deemed important. The ammonium phosphite or the ammonium phosphate/phosphite solutions can be manufactured in any standard 10-34-0 or 8-24-0 plant with such cooling capacity. If the 10-34-0 plant has a pipe reactor or similar high temperature polymerization reactor, this part of the plant must be bypassed by the phosphorous acid stream since it will decompose the phosphorous acid if it does not bypass.

To produce 9.6-34-0 compound, phosphorous acid, ammonia and water are merely added to the reactor and mixed appropriately at the temperature and pH set forth previously. To produce 9.8-34-0 orthopolyphosphoric acid via a polymerization reactor, phosphorus acid, ammonia, and water are added to the reactor. Alternatively, premanufactured 10-34-0 ammonium phosphate, phosphorous acid, ammonia and water are all added to the reactor. However, using premanufactured 10-34-0 ammonium phosphate is not preferred since such use may result in some hydrolysis thereby adversely affecting product stability. To produce 8.8-29-0 compound solution, orthophosphoric acid, phosphorous acid, ammonia and water are added to the reactor. Alternatively, premanufactured 8-24-0 compound, phosphorous acid, ammonia and water are added to the reactor. The following is an example of commercial production:

Commercial Manufacture Example

The Western Farm Service 10-34-0 plant at Alpaugh, Calif. was modified with an additional line and valves to allow the phosphorous acid, 0-60-0, to be added directly to the mix tank, bypassing the 'pipe reactor'. The Alpaugh 10-34-0 plant was operated to produce about 4,500 gal. of 9.8-34-0 ammonium phosphate/phosphite solution. About 24,320 lb. (2,078 gal.) of 10-34-0 ammonium phosphate from the Western Farm Service inventory and about 7,690 lb. (723 gal.) of water were added to the mix tank and cooling tower. With the mixer and cooling tower operating about 13,743 lb. (1,174 gal.) of 0-60-0 phosphorous acid and about 2,843 lb. (552 gal.) of anhydrous ammonia were added simultaneously over a period of about 90 minutes. During the operation the pH of the reactor solution was maintained between 5.5 and 6.5 by adjusting the ammonia flow. The final pH of the product was adjusted to 6.2. Additional water was added to the final product (to compensate for water lost in the cooling tower) to adjust the final product specific gravity to 1.29. The heat load on the plant is about 50% of the heat load from the production of standard 10-34-0. The reaction temperature during the production was maintained less than 140° F. The final 9.8-34-0 product, a clear light green solution, was transferred to storage. Table 3 shows the recipe for various batch sizes of 9.8-34-0 in a standard 10-34-0 plant:

Analysis of the product showed it to contain 10.1% nitrogen (Kjeldahl), 16.9% $P_2O_5$ as phosphate (Ion Chromatography) and 17.2% $P_2O_5$ as phosphite (Ion Chromatography).

Efficacy Testing

A study was conducted to demonstrate the efficacy of the fertilizer materials of the invention as compared with various controls. Four tests were conducted with the first test directed to use of a fertilizer of the invention, 9.8-34-0 ammonium phosphate/ammonium phosphite solution. The remaining three tests were directed to the use of various conventional fertilizers.

Procedure

Plastic pots, 5 inches in diameter, were filled with San Joaquin Valley calcareous soil, pH 7.9. The phosphate fertilizer treatments were applied to the soil as a 1 inch band at a depth of 2 inches. Tomato seeds, Early Girl variety, 3 seeds per pot, were planted at a depth of 1 inch. The plants were grown in the greenhouse under standard conditions. The tomato plants were allowed to grow for 30 days (early bloom). The petiole of the fourth leaf from the growing tip was harvested from each plant and analyzed for total phosphorus.

Treatments

All treatments were applied at the rate of 100 pounds per acre, $P_2O_5$ equivalent.

| Treatment Number | Treatment Description |
|---|---|
| 1 | 9.8-34-0 (ammonium phosphate/ammonium phosphite solution) |
| 2 | 10-34-0 (ammonium phosphate solution) |
| 3 | $(NH_4)_2HPO_3$ (diammonium phosphite) |
| 4 | $K_2HPO_3$ (dipotassium phosphite) |
| Replications | |
| 4 | |

TABLE 3

| Batch Size, | Add to Mix Tank | | | Add Simultaneously. Temp. 150 F. Max | | | | Run Time[1] |
|---|---|---|---|---|---|---|---|---|
| Gal Product | 10-34-0, gal | Water, gal | Total gal | 0-60-0, lb | 0-60-0, gal | $NH_3$, lb | $NH_3$, lb | Min. |
| 1000 | 462.3 | 204.5 | 666.8 | 3054 | 260.8 | 631.7 | 122.7 | 16.30 |
| 1500 | 693.4 | 306.8 | 1000 | 4581 | 391.2 | 947.6 | 184.0 | 24.45 |
| 2000 | 924.5 | 409.0 | 1334 | 6108 | 521.6 | 1263.4 | 245.3 | 32.60 |
| 2500 | 1155.7 | 511.3 | 1667 | 7635 | 652.0 | 1579.3 | 306.7 | 40.75 |
| 3000 | 1386.8 | 613.5 | 2000 | 9162 | 782.4 | 1895.1 | 368.0 | 48.90 |
| 3500 | 1617.9 | 715.8 | 2334 | 10689 | 912.8 | 2211.0 | 429.3 | 57.05 |
| 4000 | 1849.1 | 818.0 | 2667 | 12216 | 1043 | 2526.8 | 490.6 | 65.20 |
| 4500 | 2080.2 | 920.3 | 3000 | 13743 | 1174 | 2842.7 | 552.0 | 73.35 |
| 5000 | 2311.3 | 1022.5 | 3334 | 15270 | 1304 | 3158.5 | 613.3 | 81.50 |

[1]At 16 gal/min. 0-80-0; 7625 gal/min $NH_3$

|  | Replication | | | | |
| --- | --- | --- | --- | --- | --- |
| Treatment No. | 1 | 2 | 3 | 4 | Mean |
| 1 | 5660 | 6111 | 5100 | 4100 | 5243 |
| 2 | 2995 | 3509 | 2515 | 3600 | 3155 |
| 3 | 3880 | 3050 | 2410 | 3255 | 3149 |
| 4 | 2517 | 3525 | 2695 | 3512 | 3062 |

Treatment 1 was most effective for providing phosphorus to the plant. Treatments 2, 3, and 4 were less effective and there is no statistically significant difference among treatments 2, 3, and 4. The combination of ammonium phosphate and ammonium phosphite is a more effective phosphate fertilizer than either ammonium phosphate, diammonium phosphite or potassium phosphite alone.

In the manufacture of such fertilizer solutions, variance of the constituents from the nominal or preferred amounts (ratios), in the range of ±10 to 20% by weight is generally considered to be within the scope of the invention. The nominal weight proportions are, of course, preferred for purposes of product shipment. The resulting solution may remain in a concentrated form to be diluted at the application site. Typically, dilution of a solution such as described commercially heretofore in the amount of 10 to 50 times with water is acceptable.

In sum, the methods and compositions of the invention are directed to the production of phosphite, $HPO_3^{2-}$ and $H_2PO_3^{1-}$, ions in solution for application as an efficacious fertilizer compound and/or fungicide. The compound has desirable foliage uptake and a desired pH for useful application.

The phosphite compounds disclosed as a source of phosphite ions may be utilized in combination with various nitrogen sources including ammonium phosphate compounds and ammonium nitrate compounds and analogs and derivatives thereof provided appropriate temperature and pH conditions are maintained. The efficacy and stability of such materials is augmented by maintaining the desired ratios of $P_2O_5$ source approximately equal in the context of phosphite and phosphate source materials. Remarkably, the manufactured phosphite or phosphate/phosphite compositions are stable in the presence of nitrate.

Variations from the disclosed method and composition may be provided without departing from the spirit and scope of the invention. The invention is therefore limited only by the following claims and equivalents thereof.

What is claimed is:

1. A concentrated nitrogen and phosphorus fertilizer composition comprising, in combination:
   an ammonium phosphite composition having a pH in solution with water in the range of about 5 to 8, and having a nitrogen-phosphorous-potassium composition of about 9.6-34-0.

2. The fertilizer of claim 1 in combination with an ammonium phosphate compound comprising a source of phosphate ions in solution.

3. The fertilizer of claim 1 in combination with ammonium phosphate wherein the amount of phosphorus from the ammonium phosphate is substantially equal to the amount of phosphorus from the ammonium phosphite.

4. A nitrogen and phosphorus fertilizer composition comprising in combination a mixture of anhydrous ammonia, phosphorous acid and water adjusted to maintain pH in the range of about 5 to 8 where the composition has a nitrogen-phoasphorous-potassium composition of about 96-34-0.

5. The composition of claim 4 adjusted to maintain pH in the range of about 5.5 to 6.5.

6. A method of manufacture of a fertilizer composition comprising the steps of:
   mixing water, a source of nitrogen and phosphorous acid and maintaining the temperature of the mixture at less than about 150° F. and pH in the range of 5 and 8 to provide a fertilizer having a concentration of ammonium phosphite as a source of phosphite ions,
   wherein the fertilizer composition has a nitrogen-phosphorous-potassium composition of about 9.6-34-0.

7. The process of claim 6 wherein the nitrogen source is selected from the group consisting of ammonia, anhydrous ammonia, ammonium nitrate and combinations thereof.

8. The process of claim 6 wherein pH is in the range of about 5.5 to 6.5.

9. The process of claim 6 wherein the phosphorous acid is polyphosphorous acid and the nitrogen-phosphorous-potassium composition of the fertilizer is 6.4-3.4-0.

10. The process of claim 6 further including mixing orthophosphoric acid and wherein the nitrogen-phosphorus-potassium composition of the fertilizer is 6.4-34-0.

11. The method of claim 6 comprising mixing a phosphate component to provide a fertilizer composition having a combination of phosphite ions and phosphate ions.

12. The method of claim 11 wherein the amount of phosphite ions is greater than the amount of phosphate ions.

13. The method of claim 1 wherein the amount of phosphite ions is substantially equal to the amount of phosphate ions.

14. The method of claim 11 wherein the fertilizer has a nitrogen-phosphorous-potassium composition of about 9.8-34-0.

15. A method of manufacture of a fertilizer composition having a nitrogen component and a phosphorous component comprising the steps of:
   mixing water with polyphosphorous acid, and a nitrogen source at a temperature below about 150° F. and at a pH of about 5–8 to provide a fertilizer having a concentration of phosphite ions,
   wherein the fertilizer composition has a nitrogen-phosphorous-potassium composition of about 6.4-34-0.

16. The method of claim 15 wherein the nitrogen source is selected from the group consisting of ammonia, anhydrous ammonia, ammonium nitrate and combinations thereof.

17. A concentrated nitrogen and phosphorous fertilizer composition comprising in combination;
   an ammonium phosphite and ammonium phosphate composition having a pH in solution with water in the range of about 5 to 8 and having a nitrogen-phosphorous-potassium composition of about 9.8-34-0.

18. The fertilizer composition of claim 17 wherein the amount of phosphorous from the ammonium phosphate is substantially equal to the amount of phosphorous from the ammonium phosphite.

19. A nitrogen and phosphorus fertilizer composition comprising in combination a mixture of anhydrous ammonia, phosphorous acid, phosphate source and water adjusted to maintain pH in the range pf 5 to 8 where the composition has a nitrogen-phosphorous-potassium composition of about 9.8-34-0.

20. The composition of claim 19 wherein the composition includes a phosphite component and a phosphate component.

21. The composition of claim 20 wherein the phosphate component is selected from the group consisting of ammonium phosphate, ammonium orthophosphate, ammonium polyphosphate and mixtures thereof.

22. The composition of claim 20 wherein the phosphate component is present in the fertilizer in an amount no more than the amount of phosphite component.

23. The composition of claim 20 wherein the phosphate component is present in the fertilizer in an amount substantially equal to the amount of phosphate component.

24. A method for fertilization of plant material comprising the step of applying a fertilizer compound as set forth in any one of claims 1–3, 4–5, 20–23 and 17–19.

25. A product made by the process of any one of the claims 6–8, 9–16, 11–13 and 14.

26. A method of use of the product of any one of claims 1–3, 4–5, 20–23 and 17–19 comprising the step of applying said product in liquid form to plants or soil as a fertilizer or fungicide, or both.

27. The fertilizer of claim 2 or claim 17 wherein the concentration of phosphite ions in the fertilizer is greater than the concentration of phosphate ions in the fertilizer.

28. The composition of claim 4 or claim 19 wherein the temperature of the composition is maintained below about 150° F.

29. The composition of claim 4 or claim 19 wherein the composition includes ammonium nitrate.

\* \* \* \* \*